United States Patent
Jung

(10) Patent No.: US 11,272,425 B2
(45) Date of Patent: Mar. 8, 2022

(54) NAN-BASED COMMUNICATION CONTROL METHOD, AND ELECTRONIC DEVICE FOR SUPPORTING SAME

(71) Applicant: Samsung Electronics Co., Ltd., Gyeonggi-do (KR)

(72) Inventor: Bu Seop Jung, Gyeonggi-do (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 0 days.

(21) Appl. No.: 16/771,051

(22) PCT Filed: Jul. 27, 2018

(86) PCT No.: PCT/KR2018/008532
§ 371 (c)(1),
(2) Date: Jun. 9, 2020

(87) PCT Pub. No.: WO2019/132151
PCT Pub. Date: Jul. 4, 2019

(65) Prior Publication Data
US 2020/0322872 A1 Oct. 8, 2020

(30) Foreign Application Priority Data
Dec. 26, 2017 (KR) .......................... 10-2017-0179538

(51) Int. Cl.
*H04W 40/32* (2009.01)
*H04W 40/24* (2009.01)
(Continued)

(52) U.S. Cl.
CPC ......... *H04W 40/32* (2013.01); *H04W 40/244* (2013.01); *H04W 40/246* (2013.01); *H04W 56/001* (2013.01); *H04W 84/20* (2013.01)

(58) Field of Classification Search
None
See application file for complete search history.

(56) References Cited

U.S. PATENT DOCUMENTS 9,258,193 B2  2/2016 Kasslin et al.
9,480,013 B2  10/2016 Fang et al.
(Continued)

FOREIGN PATENT DOCUMENTS

KR  10-2016-0042009 A  4/2016
WO  2017/051501 A  3/2017

OTHER PUBLICATIONS

Korean Search Report dated Nov. 30, 2021.

*Primary Examiner* — Kenny S Lin
(74) *Attorney, Agent, or Firm* — Cha & Reiter, LLC

(57) ABSTRACT

Provided is an electronic device comprising a wireless communication module, a memory for storing attribute information on a first cluster including the electronic device, and a processor electrically connected to the wireless communication module and the memory, wherein the processor is configured so as to perform synchronization with the first cluster in relation to the performance of neighbor awareness networking (NAN)-based communication, receive a first signal including attribute information on a second cluster from an external electronic device included in the second cluster through the wireless communication module, compare attribute information on the first cluster, which is stored in the memory, with attribute information on the second information, maintain the synchronization with the first cluster and perform synchronization with the second cluster when a condition designated between the attribute information on the first cluster and the attribute information on the second cluster is satisfied, and transmit, on the basis of at least part of the synchronization with the second cluster, a second signal including information on the first cluster to the external electronic device through the wireless communication module.

15 Claims, 9 Drawing Sheets

(51) Int. Cl.
  *H04W 56/00*  (2009.01)
  *H04W 84/20*  (2009.01)

(56) References Cited

U.S. PATENT DOCUMENTS

| | | |
|---|---|---|
| 9,525,974 B2 | 12/2016 | Segev et al. |
| 9,572,007 B2 | 2/2017 | Park et al. |
| 9,788,257 B2 | 10/2017 | Singh et al. |
| 9,819,750 B2 * | 11/2017 | Raissinia ............... H04L 67/16 |
| 9,888,438 B2 | 2/2018 | Fang et al. |
| 9,924,446 B2 | 3/2018 | Park et al. |
| 9,949,084 B2 | 4/2018 | Segev et al. |
| 9,961,668 B2 | 5/2018 | Patil et al. |
| 10,009,746 B2 | 6/2018 | Jung |
| 10,080,182 B2 | 9/2018 | Kim et al. |
| 10,177,222 B2 | 1/2019 | Won et al. |
| 10,200,950 B2 | 2/2019 | Park et al. |
| 10,271,277 B2 | 4/2019 | Park et al. |
| 10,313,961 B2 | 6/2019 | Jung et al. |
| 10,433,109 B2 | 10/2019 | Segev et al. |
| 10,511,953 B2 | 12/2019 | Yoshikawa |
| 2014/0321317 A1 * | 10/2014 | Kasslin ................ H04W 4/08 370/254 |
| 2015/0098388 A1 * | 4/2015 | Fang ..................... H04W 8/005 370/328 |
| 2015/0200811 A1 | 7/2015 | Kasslin et al. |
| 2015/0358800 A1 | 12/2015 | Park et al. |
| 2016/0014565 A1 | 1/2016 | Segev et al. |
| 2016/0112986 A1 | 4/2016 | Patil et al. |
| 2016/0150465 A1 | 5/2016 | Jung et al. |
| 2016/0192273 A1 * | 6/2016 | Oren ..................... H04W 48/16 370/329 |
| 2016/0286461 A1 | 9/2016 | Patil et al. |
| 2016/0286476 A1 | 9/2016 | Patil et al. |
| 2017/0034769 A1 | 2/2017 | Kim et al. |
| 2017/0111782 A1 | 4/2017 | Park et al. |
| 2017/0111849 A1 | 4/2017 | Park et al. |
| 2017/0111862 A1 | 4/2017 | Park et al. |
| 2017/0135019 A1 | 5/2017 | Vamaraju et al. |
| 2017/0150296 A1 | 5/2017 | Jung |
| 2017/0156031 A1 | 6/2017 | Segev et al. |
| 2017/0156102 A1 | 6/2017 | Singh et al. |
| 2017/0164327 A1 | 6/2017 | Patil et al. |
| 2017/0171169 A1 | 6/2017 | Lee et al. |
| 2018/0227707 A1 | 8/2018 | Segev et al. |
| 2019/0028875 A1 | 1/2019 | Yoshikawa |
| 2019/0268834 A1 | 8/2019 | Jung et al. |
| 2020/0145811 A1 | 5/2020 | Yoshikawa |

* cited by examiner

NAN-BASED COMMUNICATION CONTROL METHOD, AND ELECTRONIC DEVICE FOR SUPPORTING SAME

This application is a National Phase Entry of PCT International Application No. PCT/KR2018/008532, which was filed on Jul. 27, 2018, and claims a priority to Korean Patent Application No. 10-2017-0179538, which was filed on Dec. 26, 2017, the contents of which are incorporated herein by reference.

TECHNICAL FIELD

The disclosure relates to technologies of merging neighbor awareness networking (NAN) clusters.

BACKGROUND ART

Recently, as electronic devices, each of which is equipped with an independent operating system, have rapidly come into wide use, various communication platforms for supporting multi-function operation of the electronic devices have been proposed. For example, a proximity service of a neighbor awareness networking (NAN) specification based on a short-range wireless communication technology supports low-power high-speed data transmission and reception between electronic devices adjacent to each other.

The proximity service of the NAN specification may form a set of electronic devices, which is called a cluster. According to the NAN specification, an electronic device included in a first cluster may discover a second cluster adjacent to the first cluster through a scanning operation and may perform synchronization with the second cluster. For example, the electronic device included in the first cluster may receive service data from the second cluster and may perform the synchronization to the second cluster, when attribute (e.g., cluster grade) information of the second cluster, which is included in the service data, is relatively higher than attribute information of the first cluster. As such, as at least one electronic device included in the first cluster performs the synchronization to the second cluster, merging between the first cluster and the second cluster may be implemented.

DISCLOSURE

Technical Problem

Based on the above-mentioned contents, an attribute of the second cluster is relatively lower than an attribute of the first cluster, an electronic device included in the first cluster may fail to perform synchronization to the second cluster. In this case, merging may not be implemented between the first cluster and the second cluster, which are adjacent to each other, and the electronic device included in the first cluster may be required to perform another scanning operation for discovering an adjacent cluster. Thus, before the electronic device included in the first cluster performs another scanning operation according to a specified period, merging of the first cluster may not be implemented. This may be a factor of delaying the merging of the first cluster.

Aspects of the disclosure are to address at least the above-mentioned problems and/or disadvantages and to provide at least the advantages described below. Accordingly, an aspect of the disclosure is to provide a method for controlling communication based on neighbor awareness networking (NAN) to implement merging between clusters adjacent to each other, irrespective of an attribute (e.g., a cluster grade) of a NAN cluster and an electronic device supporting the same.

Technical Solution

In accordance with an aspect of the disclosure, an electronic device is provided. The electronic device may include a wireless communication module configured to communicate with at least one external electronic device, a memory for storing attribute information of a first cluster including the electronic device; and, a processor electrically connected with the wireless communication module and the memory.

According to an embodiment, the processor may perform synchronization with the first cluster, in conjunction with performing communication based on neighbor awareness networking (NAN), may receive a first signal including attribute information of a second cluster from an external electronic device included in the second cluster via the wireless communication module, may compare attribute information of the first cluster, the attribute information being stored in the memory, with the attribute information of the second cluster, may perform synchronization with the second cluster while maintaining the synchronization with the first cluster, when a specified condition is met between the attribute information of the first cluster and the attribute information of the second cluster, and may transmit a second signal including information related to the first cluster to the external electronic device via the wireless communication module based at least in part on the synchronization with the second cluster.

Advantageous Effects

According to various embodiments, when performing merging between neighbor awareness networking (NAN) clusters, a merging platform which is not limited to attributes (e.g., cluster grades) of the clusters may be provided.

According to various embodiments, the electronic device may reduce power consumption by minimizing a cluster scanning operation of the electronic device included in a NAN cluster.

In addition, various effects ascertained directly or indirectly through the present disclosure may be provided.

MODE FOR INVENTION

Figure 1:
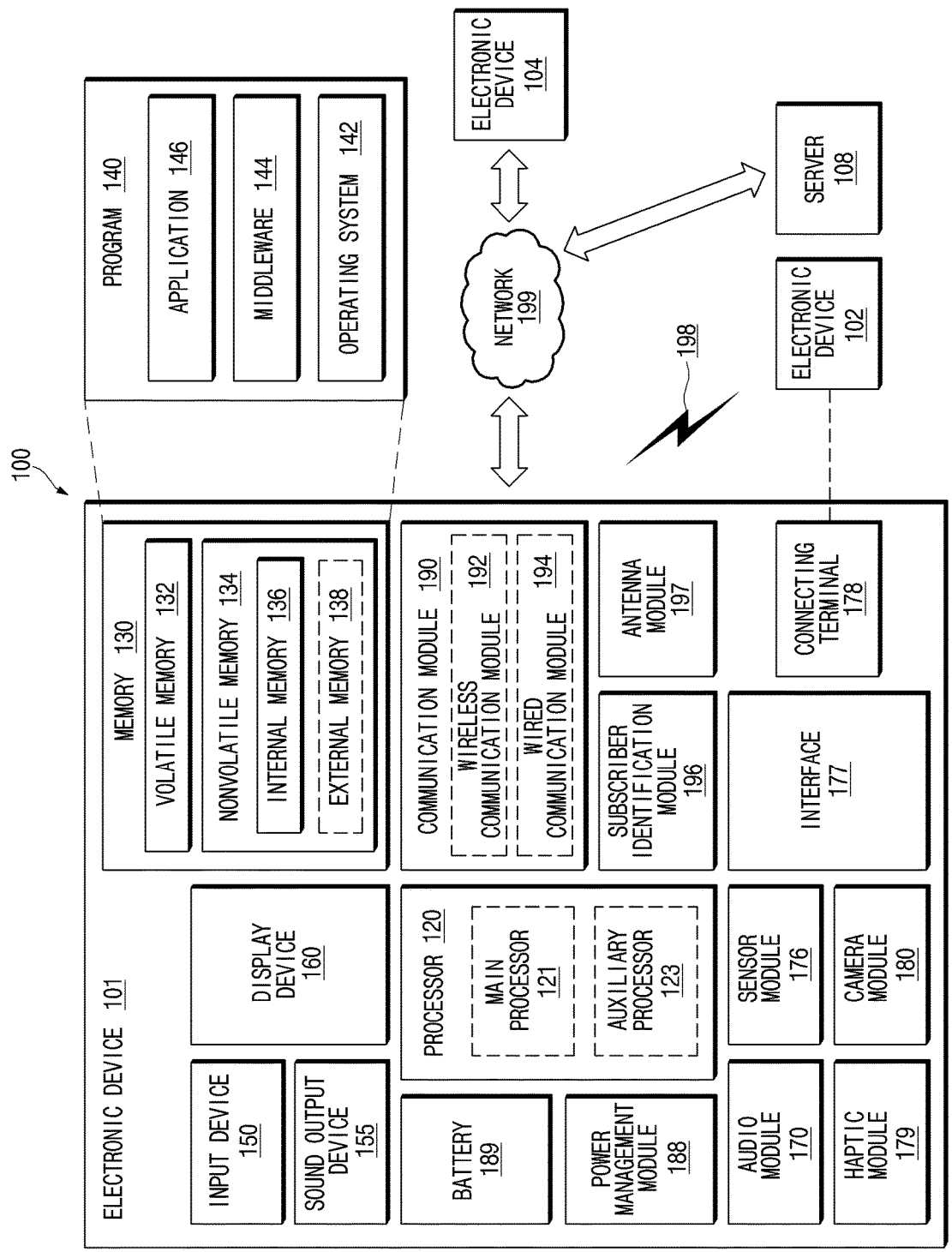
FIG. 1 is a block diagram illustrating an electronic device in a network environment according to an embodiment.

The electronic device according to various embodiments disclosed in the present disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the present disclosure should not be limited to the above-mentioned devices.

It should be understood that various embodiments of the present disclosure and terms used in the embodiments do not intend to limit technologies disclosed in the present disclosure to the particular forms disclosed herein; rather, the present disclosure should be construed to cover various modifications, equivalents, and/or alternatives of embodiments of the present disclosure. With regard to description of drawings, similar components may be assigned with similar reference numerals. As used herein, singular forms may include plural forms as well unless the context clearly indicates otherwise. In the present disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

According to the situation, the expression "configured to" used in the disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the disclosure are used to describe specified embodiments and are not intended to limit the scope of the disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the disclosure. In some cases, even if terms are terms which are defined in the disclosure, they may not be interpreted to exclude embodiments of the disclosure.

An electronic device according to various embodiments of the disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs)), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of the present disclosure may not be limited to the above-described electronic devices and may include other electronic devices and new electronic devices according to the development of technologies.

Hereinafter, electronic devices according to various embodiments will be described with reference to the accompanying drawings. In the disclosure, the term "user" may refer to a person who uses an electronic device or may refer to a device (e.g., an artificial intelligence electronic device) that uses the electronic device.

FIG. 1 is a block diagram of an electronic device in a network environment according to various embodiments.

Referring to FIG. 1, an electronic device 101 may communicate with an electronic device 102 through a first network 198 (e.g., a short-range wireless communication) or may communicate with an electronic device 104 or a server 108 through a second network 199 (e.g., a long-distance wireless communication) in a network environment 100. According to an embodiment, the electronic device 101 may communicate with the electronic device 104 through the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, and an antenna module 197. According to some embodiments, at least one (e.g., the display device 160 or the camera module 180) among components of the electronic device 101 may be omitted or other components may be added to the electronic device 101. According to some embodiments, some components may be integrated and implemented as in the case of the sensor module 176 (e.g., a fingerprint sensor, an iris sensor, or an illuminance sensor) embedded in the display device 160 (e.g., a display).

The processor 120 may operate, for example, software (e.g., a program 140) to control at least one of other components (e.g., a hardware or software component) of the electronic device 101 connected to the processor 120 and may process and compute a variety of data. The processor 120 may load a command set or data, which is received from other components (e.g., the sensor module 176 or the communication module 190), into a volatile memory 132, may process the loaded command or data, and may store result data into a nonvolatile memory 134. According to an embodiment, the processor 120 may include a main processor 121 (e.g., a central processing unit or an application processor) and an auxiliary processor 123 (e.g., a graphic processing device, an image signal processor, a sensor hub processor, or a communication processor), which operates independently from the main processor 121, additionally or alternatively uses less power than the main processor 121, or is specified to a designated function. In this case, the auxiliary processor 123 may operate separately from the main processor 121 or embedded.

In this case, the auxiliary processor 123 may control, for example, at least some of functions or states associated with at least one component (e.g., the display device 160, the sensor module 176, or the communication module 190) among the components of the electronic device 101 instead of the main processor 121 while the main processor 121 is in an inactive (e.g., sleep) state or together with the main processor 121 while the main processor 121 is in an active (e.g., an application execution) state. According to an embodiment, the auxiliary processor 123 (e.g., the image signal processor or the communication processor) may be implemented as a part of another component (e.g., the camera module 180 or the communication module 190) that is functionally related to the auxiliary processor 123. The memory 130 may store a variety of data used by at least one component (e.g., the processor 120 or the sensor module 176) of the electronic device 101, for example, software (e.g., the program 140) and input data or output data with respect to commands associated with the software. The memory 130 may include the volatile memory 132 or the nonvolatile memory 134.

The program 140 may be stored in the memory 130 as software and may include, for example, an operating system 142, a middleware 144, or an application 146.

The input device 150 may be a device for receiving a command or data, which is used for a component (e.g., the processor 120) of the electronic device 101, from an outside (e.g., a user) of the electronic device 101 and may include, for example, a microphone, a mouse, or a keyboard.

The sound output device 155 may be a device for outputting a sound signal to the outside of the electronic device 101 and may include, for example, a speaker used for general purposes, such as multimedia play or recordings play, and a receiver used only for receiving calls. According to an embodiment, the receiver and the speaker may be either integrally or separately implemented.

The display device 160 may be a device for visually presenting information to the user of the electronic device 101 and may include, for example, a display, a hologram device, or a projector and a control circuit for controlling a corresponding device. According to an embodiment, the display device 160 may include a touch circuitry or a pressure sensor for measuring an intensity of pressure on the touch.

The audio module 170 may convert a sound and an electrical signal in dual directions. According to an embodiment, the audio module 170 may obtain the sound through the input device 150 or may output the sound through an external electronic device (e.g., the electronic device 102 (e.g., a speaker or a headphone)) wired or wirelessly connected to the sound output device 155 or the electronic device 101.

The sensor module 176 may generate an electrical signal or a data value corresponding to an operating state (e.g., power or temperature) inside or an environmental state outside the electronic device 101. The sensor module 176 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 177 may support a designated protocol wired or wirelessly connected to the external electronic device (e.g., the electronic device 102). According to an embodiment, the interface 177 may include, for example, an HDMI (high-definition multimedia interface), a USB (universal serial bus) interface, an SD card interface, or an audio interface.

A connecting terminal 178 may include a connector that physically connects the electronic device 101 to the external electronic device (e.g., the electronic device 102), for example, an HDMI connector, a USB connector, an SD card connector, or an audio connector (e.g., a headphone connector).

The haptic module 179 may convert an electrical signal to a mechanical stimulation (e.g., vibration or movement) or an electrical stimulation perceived by the user through tactile or kinesthetic sensations. The haptic module 179 may include, for example, a motor, a piezoelectric element, or an electric stimulator.

The camera module 180 may shoot a still image or a video image. According to an embodiment, the camera module 180 may include, for example, at least one lens, an image sensor, an image signal processor, or a flash.

The power management module 188 may be a module for managing power supplied to the electronic device 101 and may serve as at least a part of a power management integrated circuit (PMIC).

The battery 189 may be a device for supplying power to at least one component of the electronic device 101 and may include, for example, a non-rechargeable (primary) battery, a rechargeable (secondary) battery, or a fuel cell.

The communication module 190 may establish a wired or wireless communication channel between the electronic device 101 and the external electronic device (e.g., the electronic device 102, the electronic device 104, or the server 108) and support communication execution through the established communication channel. The communication module 190 may include at least one communication processor operating independently from the processor 120 (e.g., the application processor) and supporting the wired communication or the wireless communication. According to an embodiment, the communication module 190 may include a wireless communication module 192 (e.g., a cellular communication module, a short-range wireless communication module, or a GNSS (global navigation satellite system) communication module) or a wired communication module 194 (e.g., an LAN (local area network) communication module or a power line communication module) and may communicate with the external electronic device using a corresponding communication module among them through the first network 198 (e.g., the short-range communication network such as a Bluetooth, a WiFi direct, or an IrDA (infrared data association)) or the second network 199 (e.g., the long-distance wireless communication network such as a cellular network, an internet, or a computer network (e.g., LAN or WAN)). The above-mentioned various communication modules 190 may be implemented into one chip or into separate chips, respectively.

According to an embodiment, the wireless communication module 192 may identify and authenticate the electronic device 101 using user information stored in the subscriber identification module 196 in the communication network.

The antenna module 197 may include one or more antennas to transmit or receive the signal or power to or from an external source. According to an embodiment, the communication module 190 (e.g., the wireless communication module 192) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 101 and the external electronic device 104 through the server 108 connected to the second network 199. Each of the electronic devices 102 and 104 may be the same or different types as or from the electronic device 101. According to an embodiment, all or some of the operations performed by the electronic device 101 may be performed by another electronic device or a plurality of external electronic devices. When the electronic device 101 performs some functions or services automatically or by request, the electronic device 101 may request the external electronic device to perform at least some of the functions related to the functions or services, in addition to or instead of performing the functions or services by itself. The external electronic device receiving the request may carry out the requested function or the additional function and transmit the result to the electronic device 101. The electronic device 101 may provide the requested functions or services based on the received result as is or after additionally processing the received result. To this end, for example, a cloud computing, distributed computing, or client-server computing technology may be used.

The electronic device according to various embodiments disclosed in the present disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the present disclosure should not be limited to the above-mentioned devices.

It should be understood that various embodiments of the present disclosure and terms used in the embodiments do not intend to limit technologies disclosed in the present disclosure to the particular forms disclosed herein; rather, the present disclosure should be construed to cover various modifications, equivalents, and/or alternatives of embodiments of the present disclosure. With regard to description of drawings, similar components may be assigned with similar reference numerals. As used herein, singular forms may include plural forms as well unless the context clearly indicates otherwise. In the present disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them. The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the present disclosure may be implemented by software (e.g., the program 140) including an instruction stored in a machine-readable storage media (e.g., an internal memory 136 or an external memory 138) readable by a machine (e.g., a computer). The machine may be a device that calls the instruction from the machine-readable storage media and operates depending on the called instruction and may include the electronic device (e.g., the electronic device 101). When the instruction is executed by the processor (e.g., the processor 120), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

Figure 2:
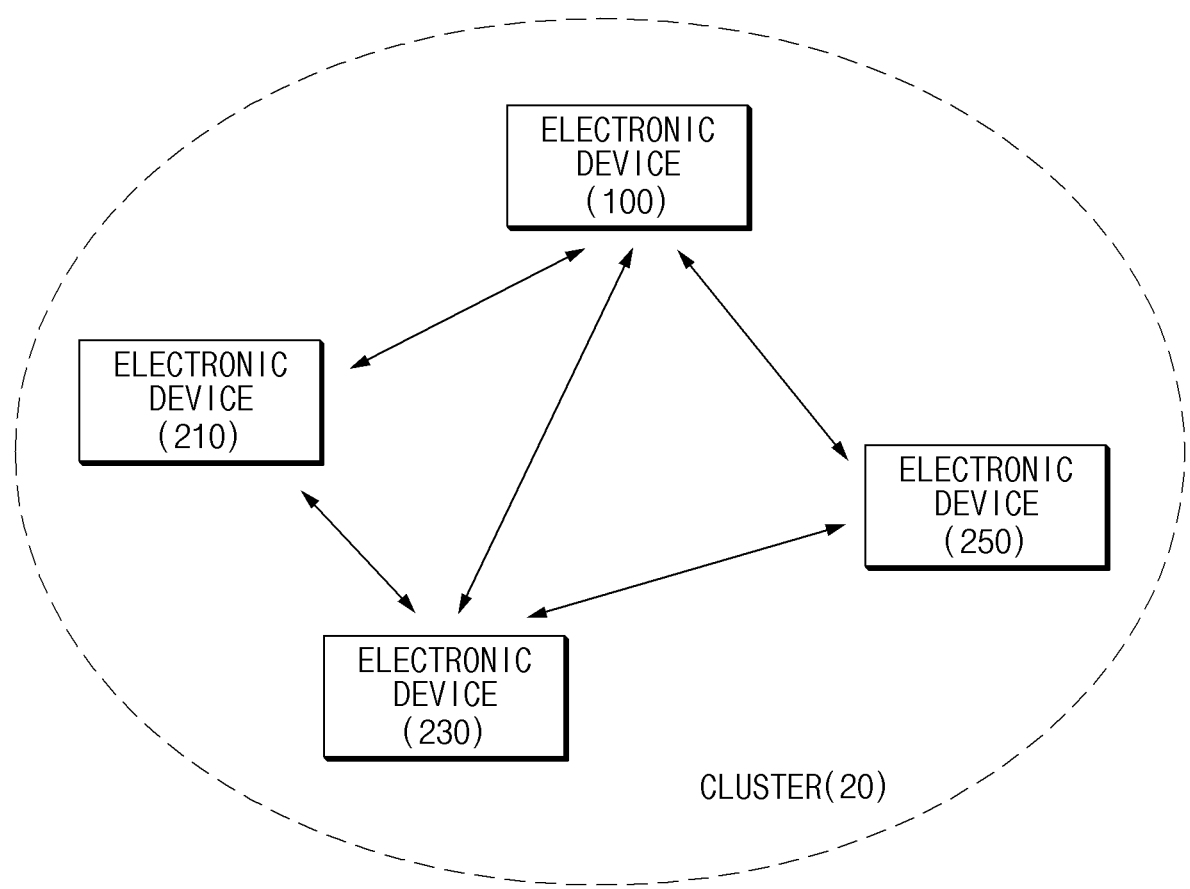
FIG. 2 is a drawing illustrating a cluster including electronic devices according to an embodiment.

FIG. 2 is a drawing illustrating a cluster including electronic devices according to an embodiment. A cluster described below may be understood as a neighbor awareness networking (NAN) cluster conforming to the NAN specification.

In an embodiment, the NAN cluster may refer to a set of at least one electronic device which transmits and receives data (or a signal) based on a proximity network. According to the NAN specification, at least one electronic device in the NAN cluster may use a set of the same parameters (e.g., a discovery window, an interval duration between discovery windows, a beacon interval, a NAN channel, or the like) in conjunction with operating the proximity network.

Referring to FIG. 2, at least one electronic device 100, 210, 230, and/or 250 may establish a network for operating a low-power proximity communication service of the NAN specification and may form a cluster 20 to interact. In an embodiment, the at least one electronic device 100, 210, 230, and/or 250 included in the cluster 20 may transmit and receive data (or a signal) based on a synchronized communication duration (e.g., a discovery window) conforming to the NAN specification. For example, the at least one electronic device 100, 210, 230, and/or 250 may transmit and receive a synchronization beacon including information associated with mutual synchronization over the synchronized communication duration. Alternatively, the at least one electronic device 100, 210, 230, and/or 250 may transmit and receive a service discovery frame associated with sharing a service advertisement or service information over the synchronized communication duration. In an embodiment, the at least one electronic device 100, 210, 230, and/or 250 may operate in a low-power state (e.g., a sleep state) in a duration (e.g., an interval duration between synchronized communication durations) except for the synchronized communication duration and may operate a network of another communication mode except for low-power proximity communication of the NAN specification.

Figure 3:
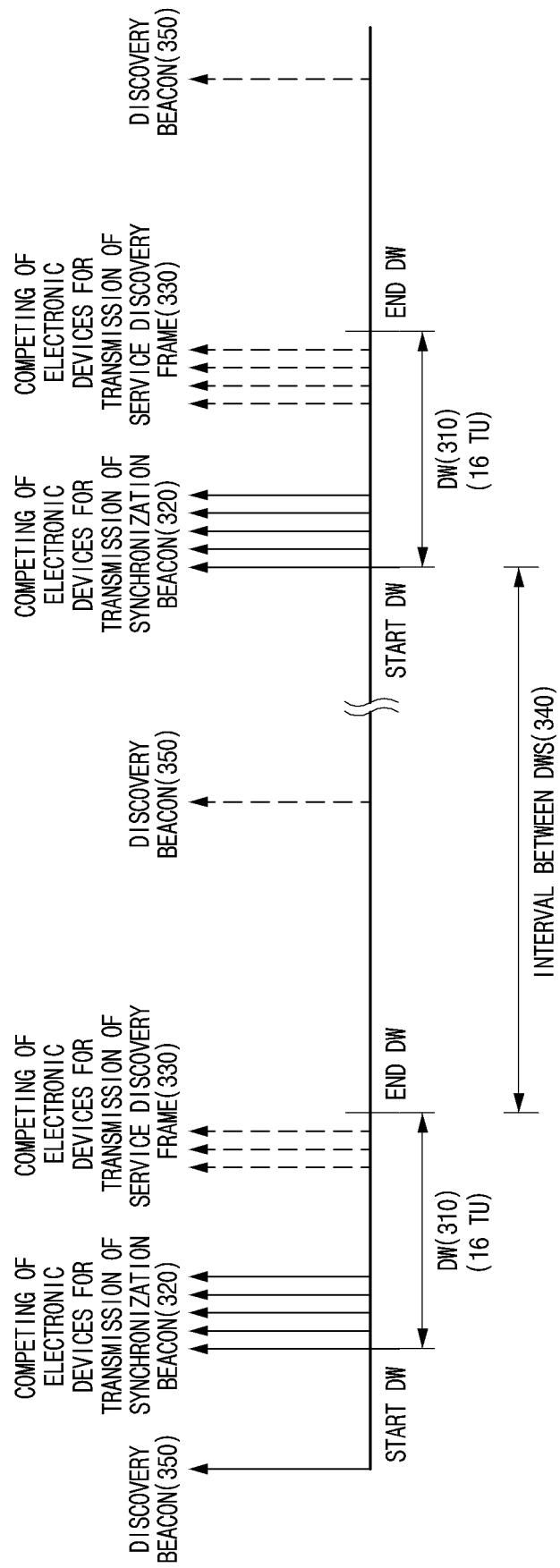
FIG. 3 is a drawing illustrating a time clock of an electronic device according to an embodiment.

FIG. 3 is a drawing illustrating a time clock of an electronic device according to an embodiment. In an embodiment described below, it may be understood that an electronic device transmits and receives a signal over a sync channel (e.g., channel 6) conforming to the NAN specification.

Referring to FIG. 3, at least one external electronic (e.g., 100, 210, 230, and/or 250 of FIG. 2) included in a cluster (e.g., 20 of FIG. 2) may occupy 16 time units according to the NAN specification and may transmit a synchronization beacon and a service discovery frame in a synchronized communication duration 310 (e.g., a discovery window (DW)) which is present at intervals of 512 time units. The transmission of the synchronization beacon 320 and the service discovery frame 330 may be performed based on competition between at least one electronic device 100, 210, 230, and/or 250.

In an embodiment, the synchronization beacon 320 may be a signal for maintaining synchronization (e.g., time clock synchronization) between the at least one electronic device 100, 210, 230, and/or 250 in the cluster 20. In this regard, the synchronization beacon 320 may include at least one information involved in the synchronization between the at least one electronic device 100, 210, 230, and/or 250. For example, the synchronization beacon 320 may include at least one of a frame control (FC) field indicating a function (e.g., a beacon) of a signal, a broadcast address, a media access control (MAC) address of an electronic device which transmits the synchronization beacon 320, a cluster identifier, a sequence control field, a time stamp for a beacon frame, a beacon interval field indicating an interval between start points of synchronized communication durations 310, or capability information of the electronic device which transmits the synchronization beacon 320. Alternatively, the synchronization beacon 320 may include an information element related to at least one proximity network, and may include, for example, service related content capable of being provided based on the proximity network. According to the NAN specification, the above-mentioned synchronization beacon 320 may be transmitted by an electronic device defined as an anchor master device, a master device, or a non-master sync device among the at least one electronic device 100, 210, 230, and/or 250 in the cluster 20.

In an embodiment, the service discovery frame 330 may be a signal for advertising a service between the at least one electronic device 100, 210, 230, and/or 250 in the cluster 20 and exchanging information associated with the service based on a proximity network. According to the NAN specification, the service discovery frame 330 may be a vendor specific public action frame, which may include various fields. For example, the service discovery frame 330 may include a category field, an action field, or the like, and may include an information element related to at least one proximity network.

In an embodiment, the at least one electronic device 100, 210, 230, and/or 250 may transmit a discovery beacon 350 in a duration 340 (e.g., an interval duration between the synchronized communication durations 310) except for the synchronized communication duration 310. The discovery beacon 350 may be a signal of a function of advertising the cluster 20, which is transmitted such that at least one other electronic device which does not participates in the cluster 20 may discover the cluster 20. For example, at least one electronic device, which does not participates in the cluster 20, may discover the cluster 20 to participate in the cluster 20 by performing a passive scan to detect the discovery beacon 350 transmitted from the at least one electronic device 100, 210, 230, and/or 250 in the cluster 20. In this regard, the discovery beacon 350 may include at least one information for synchronization to the cluster 20. For example, the discovery beacon 350 may include at least one of a frame control (FC) field indicating a function (e.g., a beacon) of a signal, a broadcast address, a media access control (MAC) address of an electronic device which transmits the discovery beacon 350, a cluster identifier, a sequence control field, a time stamp for a beacon frame, a beacon interval field indicating a transmit interval of the discovery beacon 350, or capability information of the electronic device which transmits the discovery beacon 350. Alternatively, the discovery beacon 350 may include an information element related to at least one proximity network. According to an embodiment, the information element may include attribute (e.g., cluster grade) information of the cluster 20.

$$\text{Master Rank}=\text{Master Preference}*2^{56}+\text{Random Factor}*2^{48}+\text{MAC}[5]*2^{40}++\text{MAC}[0] \quad \text{[Equation 1]}$$

Equation 1 above may represent a master rank referenced in conjunction with determining an attribute (e.g., a cluster grade) of a cluster. According to the NAN specification, the master rank may indicate a relative importance or numerical size of an electronic device to play a master role among at least one electronic device forming the cluster. In an embodiment, the master rank may be composed of factors such as a master preference (e.g., values of 0 to 128), a random factor (e.g., values of 0 to 255), and a MAC address (e.g., an interface address of a NAN electronic device), and a master rank value according to a value obtained by adding the factors may refer to a size or level of a cluster attribute (e.g., a cluster grade). For example, when a master rank value of a master electronic device included in cluster A is relatively higher (or greater) than a master rank value of a master electronic device included in cluster B, it may be understood that an attribute of cluster A is relatively higher (or greater) than an attribute of cluster B. In various embodiments, an attribute (e.g., a cluster grade) of the cluster may be determined by a master rank value calculated with reference to only some (e.g., a master preference) of factors constituting the master rank. Alternatively, in various embodiments, the attribute (e.g., the cluster grade) of the cluster may be determined with reference to the number of electronic devices forming the cluster (or included in the cluster), the number of services provided by the cluster, a security level of the cluster, or the like, excluding the above-mentioned master rank value.

In an embodiment, proximity network related information element, which is included in the synchronization beacon 320, the service discovery frame 330, or the discovery beacon 350, may include an identifier indicating a type of information, a length of the information, or a body field. The body field may include at least one of master indication information, cluster information, service identifier list information, service descriptor information, connection capability information, wireless LAN infrastructure information, peer to peer (P2P) operation information, independent basic service set (IBSS) information, mesh information, additional proximity network service discovery information, further availability map information, country code information, ranging information, cluster discovery information, or vendor specific information.

Figure 4:
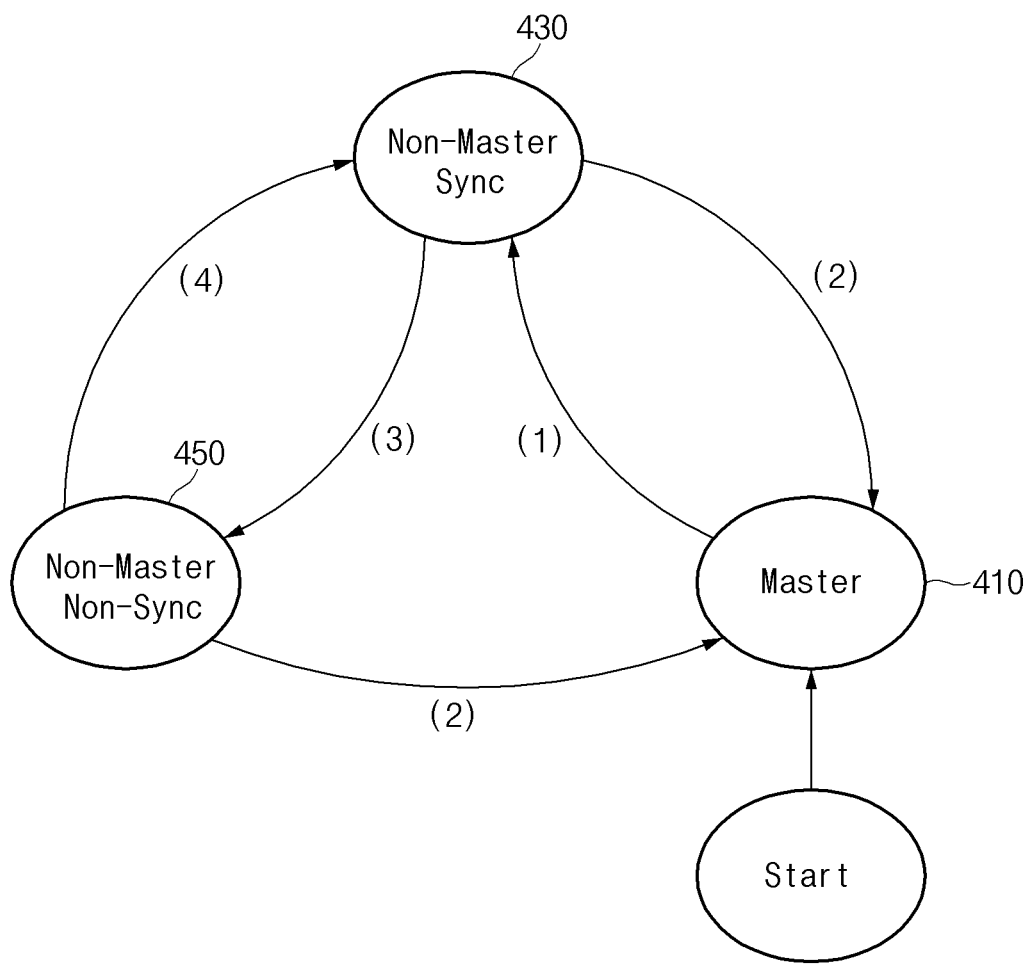
FIG. 4 is a drawing illustrating a state transition form among a plurality of electronic devices included in a cluster according to an embodiment.

FIG. 4 is a drawing illustrating a state transition form among a plurality of electronic devices included in a cluster according to an embodiment.

Referring to FIG. 4, at least one electronic device (e.g., 100, 210, 230, and/or 250 of FIG. 2) included in a cluster (e.g., 20 of FIG. 2) may have a role and state of any one of a master device 410, a non-master sync device 430, or a non-master non-sync device 450. As shown in Table 1 below, an electronic device may determine whether to transmit a synchronization beacon (e.g., 320 of FIG. 3) and/or a discovery beacon (e.g., 350 of FIG. 3) depending on a corresponding role or state.

TABLE 1

| Role and state | Discover beacon | Synchronization Beacon |
|---|---|---|
| master device | Transmissible | Transmissible |
| non-master sync | Non-transmissible | Transmissible |
| non-master non-sync | Non-transmissible | Non-transmissible |

According to the NAN specification, when starting a cluster or participating in the cluster, the electronic device may have a role and state of the master device 410, and the role and state of the electronic device may switch according to a specified condition.

In an embodiment, during a synchronized communication duration (e.g., a discovery window), when the following conditions are met, an electronic device having a role and state of the master device 410 may switch to a role and state of the non-master sync device 430 (see reference numeral 1).

The electronic device having the role and state of the master device 410 should receive a synchronization beacon, a received signal strength indication (RSSI) of which is higher than RSSI_close (e.g., a value greater than −60 dBm), from an electronic device in the same cluster. A master rank of an electronic device which transmits the synchronization beacon should be higher than a master rank of the electronic device having the role and state of the master device 410.

Alternatively, the electronic device having the role and state of the master device 410 should receive synchronization beacons, each of which has an RSSI higher than RSSI_middle (e.g., a value greater than 75 dBm and is less than RSSI_close), from three or more electronic devices in the same cluster. Master ranks of the electronic devices which transmit the synchronization beacons should be higher than the master rank of the electronic device having the role and state of the master device 410.

In an embodiment, during a synchronized communication duration (e.g., a discovery window), when the following conditions are met, an electronic device having a role and state of the non-master device 430 and/or 450 may switch to the role and state of the master device 410 until the synchronized communication duration is ended (see reference numeral 2).

The electronic device having the role and state of the non-master device 430 and/or 450 should not receive a synchronization beacon, an RSSI of which is higher than RSSI_close, from an electronic device in the same cluster. A master rank of the electronic device which transmits the synchronization beacon should be higher than the master rank of the electronic device having the role and state of the master device 410.

Furthermore, the electronic device having the role and state of the non-master device 430 and/or 450 should receive synchronization beacons, each of which has an RSSI higher than RSSI_middle, from less than three electronic devices in the same cluster. Master ranks of the electronic devices which transmit the synchronization beacon should be higher than the master rank of the electronic device having the role and state of the master device 410.

In an embodiment, during a synchronized communication duration (e.g., a discovery window), when any one of the following conditions is met, the electronic device having the role and state of the non-master sync device 430 may switch to the role and state of the non-master non-sync device 450 (see reference numeral 3).

The electronic device having the role and state of the non-master sync device 430 should receive a synchronization beacon, an RSSI of which is higher than RSSI_close, from an electronic device in the same cluster. An AMR value of the synchronization beacon should be the same as an AMR value stored in the electronic device having the role and state of the non-master sync device 430. A hop count field value of the electronic device, which transmits the synchronization beacon, should be less than or equal to a hop count field value of the electronic device having the role and state of the non-master sync device 430. A master rank of the electronic device, which transmits the synchronization beacon, should be higher than a master rank of the electronic device having the role and state of the non-master sync device 430.

The electronic device having the role and state of the non-master sync device 430 should receive synchronization beacons, each of which has an RSSI higher than RSSI_close, from three or more electronic devices in the same cluster. AMR values of the synchronization beacons should be the same as an AMR value stored in the electronic device having the role and state of the non-master sync device 430. Hop count field values of the electronic devices, which transmit the synchronization beacons, should be less than or equal to a hop count field value of the electronic device having the role and state of the non-master sync device 430. Master ranks of the electronic devices, which transmit the synchronization beacons, should be higher than a master rank of the electronic device having the role and state of the non-master sync device 430.

In an embodiment, when all the following conditions are met, the electronic device having the role and state of the non-master non-sync device 450 may switch to the role and state of the master sync device 430 until a synchronized communication duration (e.g., a discovery window) is ended (see reference numeral 4).

The electronic device having the role and state of the non-master sync device 450 should not receive a synchronization beacon, an RSSI of which is higher than RSSI_close, from an electronic device in the same cluster. An AMR value of the synchronization beacon should be the same as an AMR value stored in the electronic device having the role and state of the non-master sync device 450. A hop count field value of the electronic device, which transmits the synchronization beacon, should be less than or equal to a hop count field value of the electronic device having the role and state of the non-master sync device 450. A master rank of the electronic device, which transmits the synchronization beacon, should be higher than a master rank of the electronic device having the role and state of the non-master sync device 450.

The electronic device having the role and state of the non-master sync device 450 should receive synchronization beacons, each of which has an RSSI higher than RSSI_close, from less than electronic devices in the same cluster. AMR values of the synchronization beacons should be the same as an AMR value stored in the electronic device having the role and state of the non-master sync device 450. Hop count field values of the electronic devices, which transmit the synchronization beacons, should be less than or equal to a hop count field value of the electronic device having the role and state of the non-master sync device 450. Master ranks of the electronic devices, which transmit the synchronization beacons, should be higher than a master rank of the electronic device having the role and state of the non-master sync device 450.

Figure 5:
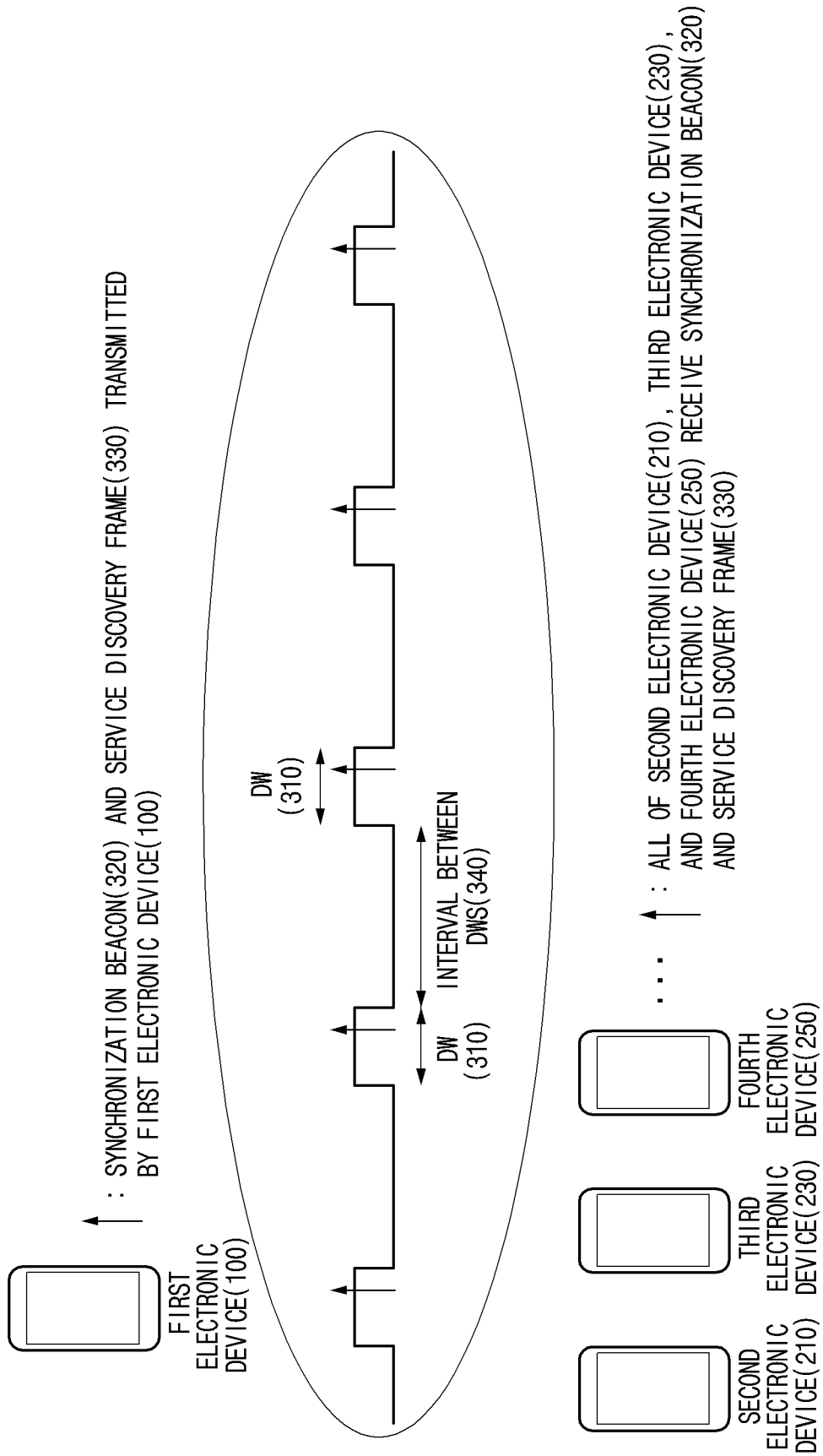
FIG. 5 is a drawing illustrating a signal transmission and reception form of an electronic device according to an embodiment.

FIG. 5 is a drawing illustrating a signal (or data) transmission and reception form of an electronic device according to an embodiment.

Referring to FIG. 5, a first electronic device 100 may transmit a synchronization beacon 320 and a service discovery frame 330 in a synchronized communication duration 310 (e.g., a discovery window (DW)). A second electronic device 210, a third electronic device 230, and/or a fourth electronic device 250 in a cluster (e.g., 20 of FIG. 2) may receive the synchronization beacon 320 and the service discovery frame 330, which are transmitted by the first electronic device 100, over the synchronized communication duration 310. According to the NAN specification, the second electronic device 210, the third electronic device 230, and/or the fourth electronic device 250 may maintain synchronization with another electronic device in the cluster 20 based on the reception of the synchronization beacon 320. Alternatively, the second electronic device 210, the third electronic device 230, and/or the fourth electronic device 250 may discover a service advertised by the first electronic device 100 to obtain service information by receiving the service discovery frame 330. In an embodiment, at least one electronic device (100, 210, 230, and/or 250) in the cluster 20 may reduce power consumption by operating in a wake state in only the synchronized communication duration 310 on a time clock and operating in a sleep state in a duration 340 (e.g., an interval duration between the synchronized communication durations 310) except for the synchronized communication duration 310. Alternatively, in various embodiments, the at least one electronic device 100, 210, 230, and/or 250 in the cluster 20 may operate a network of another communication mode except for low-power proximity communication of the NAN specification in a duration (e.g., the interval 340 between DWs) except for the synchronized communication duration 310.

Figure 6:
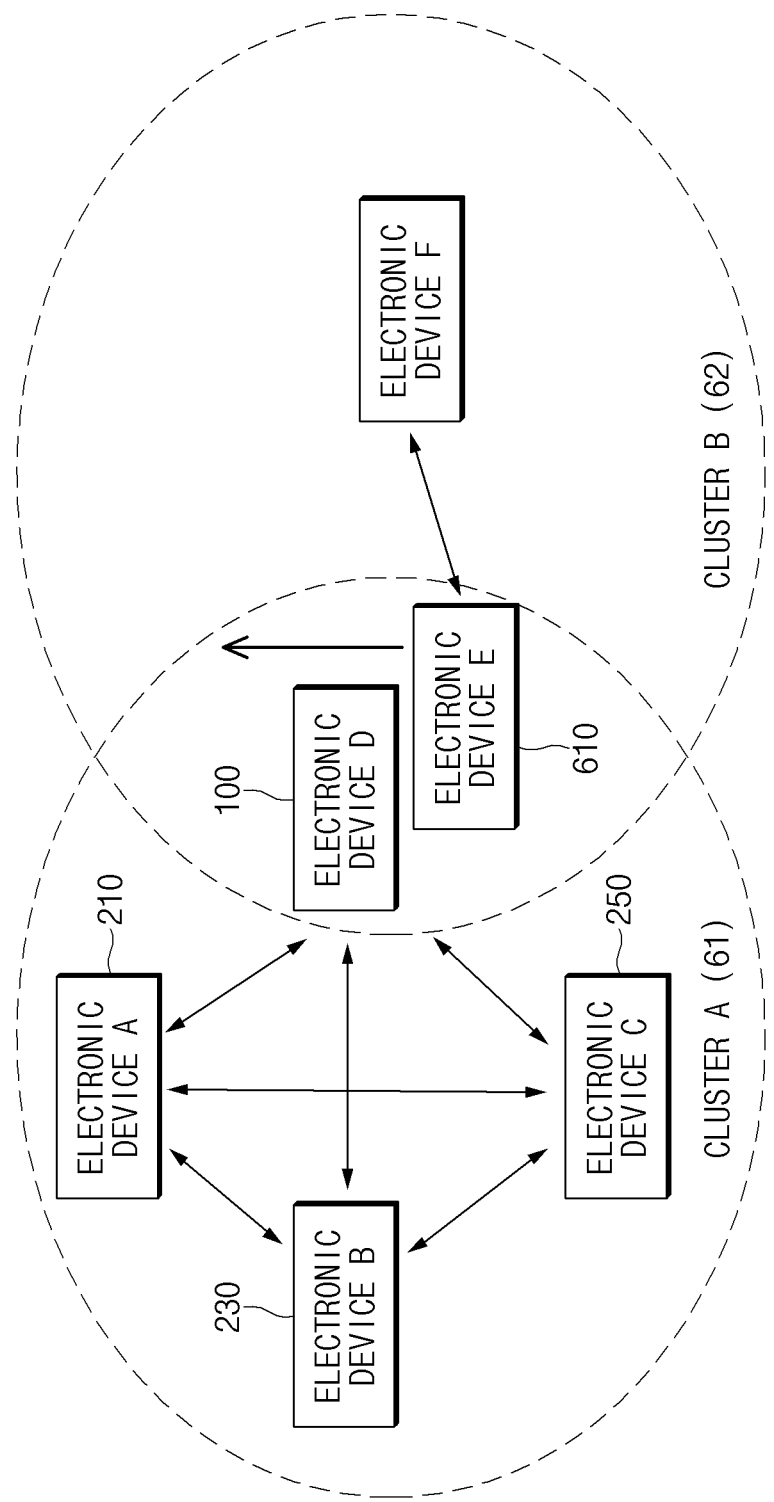
FIG. 6 is a drawing illustrating a merging form between a plurality of clusters according to an embodiment.
Figure 7:
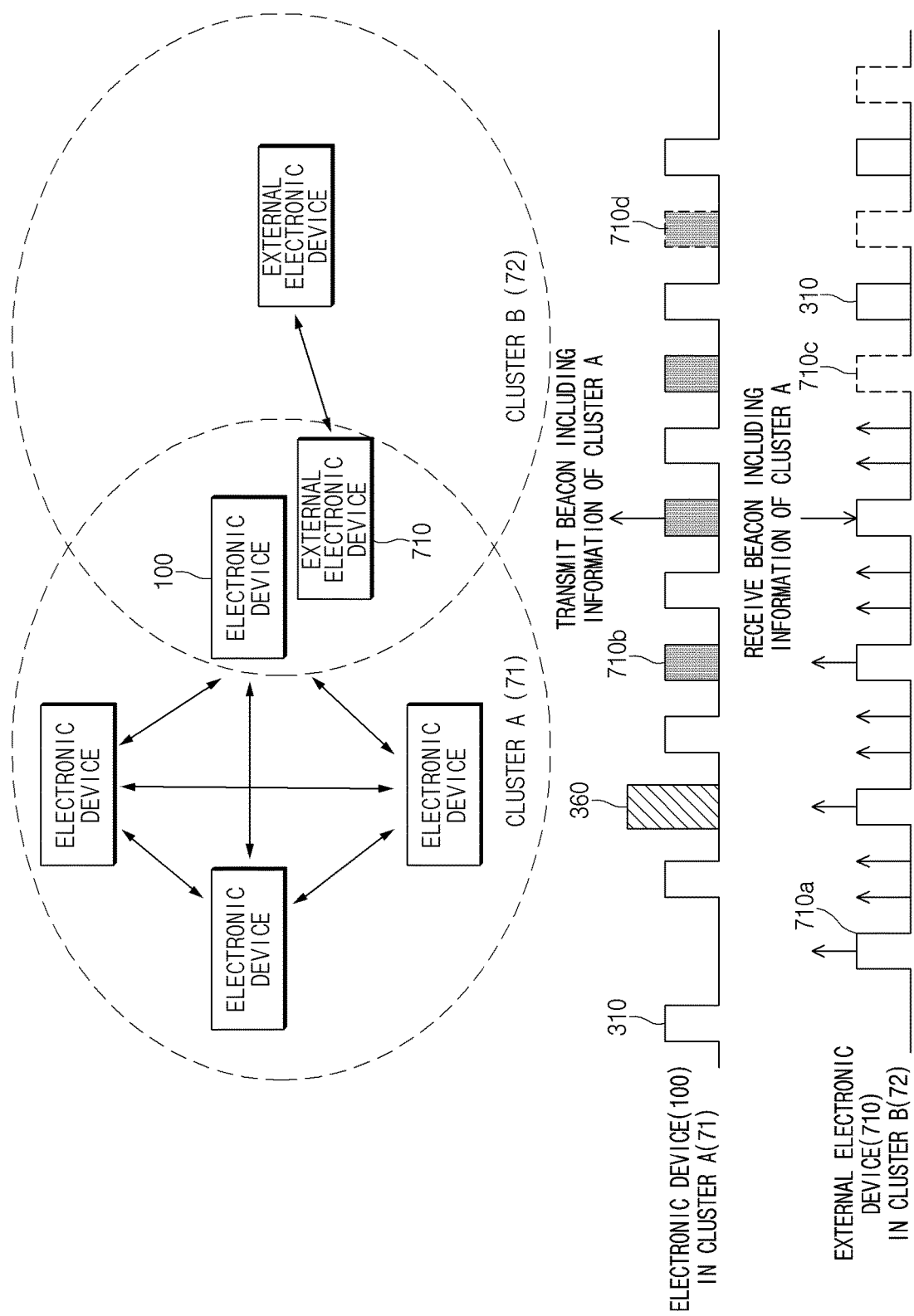
FIG. 7 is a drawing illustrating a merging process between a plurality of clusters according to an embodiment.

FIG. 6 is a drawing illustrating a merging form between a plurality of clusters according to an embodiment. In FIG. 6 or FIG. 7 below, electronic device D 100 (e.g., an electronic device 101 of FIG. 1) included in cluster A 61 or 71 may play a role as a master device or an anchor master device and may include a state of the master device or the anchor master device.

Referring to FIG. 6, each of cluster A 61 and cluster B 62 may include at least one electronic device. According to an embodiment, a range of cluster A 61 or cluster B 62 may be changed by movement of any electronic device (or a change in signal intensity of the electronic device) synchronized to cluster A 61 or cluster B 62. At least a portion of cluster A 61 and at least a portion of cluster B 62 may be overlapped with each other according to the change in range. Cluster A 61 and cluster B 62 may be merged based on attributes (e.g., cluster grades) of the clusters 61 and 62.

In conjunction with the above-mentioned contents, electronic device D 100 (e.g., the electronic device 101 of FIG. 1) included in cluster A 61 may perform a passive scan to receive proximity service data of cluster B 62, which is transmitted from any electronic device included in cluster B 62. In this case, electronic device D 100 may be determined as a cluster overlapped with or adjacent to cluster A 61 with respect to cluster B 62. In various embodiments, the proximity service data provided from cluster B 62 may include at least one of a synchronization beacon, a service discovery frame, or a discovery beacon for cluster B 62.

In an embodiment, electronic device D 100 may compare attributes (e.g., cluster grades) of cluster A 61, in which electronic device D 100 is currently participating, and cluster B 62 and may select a cluster for synchronization. For example, when it is determined that an attribute of cluster A 61 is relatively higher (or greater) than an attribute of cluster B 62 by electronic device D 100, electronic device D 100 may maintain synchronization to cluster A 61. In this operation, electronic device D 100 may guide at least one electronic device (e.g., electronic device E 610) included in cluster B 62 to perform synchronization to cluster A 61. For example, electronic device D 100 may advertise cluster A 61 by performing temporal synchronization to cluster B 62 and transmitting information related to cluster A 61 using a communication duration of a period which is the same as or similar to a synchronized communication duration (e.g., a discovery window) of cluster B 62. It will be described with reference to FIG. 7 below.

Similarly, electronic device E 610 included in cluster B 62 may receive proximity service data of cluster A 61 overlapped with or adjacent to cluster B 62 and may compare attributes (e.g., cluster grades) of cluster B 62 and cluster A 61. In an embodiment, when the attribute of cluster B 62 is relatively lower (or less) than the attribute of cluster A 61 by electronic device E 610, electronic device E 610 may perform synchronization to cluster A 61.

FIG. 7 is a drawing illustrating a merging process between a plurality of clusters according to an embodiment.

Referring to FIG. 7, an electronic device 100 (e.g., an electronic device 101 of FIG. 1) in cluster A 71 may detect proximity service data transmitted from an external cluster overlapped with or adjacent to cluster A 71 over some duration on a time clock. For example, the electronic device 100 may detect a synchronization beacon or a discovery beacon transmitted from an external electronic device 710 in cluster B 72 over a passive scan duration 360 corresponding to a portion of a duration (e.g., an interval duration between synchronized communication durations 310) except for the synchronized communication duration 310 (e.g., a discovery window).

In an embodiment, the electronic device 100 may select a cluster to be synchronized between cluster A 71 in which the electronic device 100 is currently participating and cluster B 72 overlapped with or adjacent to cluster A 71. in this regard, the electronic device 100 may compare an attribute (e.g., a cluster grade) of cluster B 72, which is included in a synchronization beacon or a discovery beacon transmitted from the external electronic device 710, with an attribute of cluster A 71. In an embodiment, the attribute of cluster A 71, which is determined by the electronic device 100, may be relatively higher (or greater) than the attribute of cluster B 72. In this case, the electronic device 100 may maintain synchronization to cluster A 71 and may perform synchronization with cluster B 72 in conjunction with advertising cluster A 71. Performing the synchronization with cluster B 72 may refer to configuring a synchronization communication duration 710b of a period, which is the same as or similar to a synchronized communication duration 710a of cluster B 72, using at least some duration except for the synchronized communication duration 310 of cluster A 71 on a time clock according to cluster A 71.

In an embodiment, the electronic device 100 may advertise cluster A 71 over the synchronization communication duration 710b of a period which is the same as or similar to the synchronized communication duration 710a of cluster B 72. For example, the electronic device 100 may advertise cluster A 71 to at least one external electronic device included in cluster B 72 and may guide the at least one external electronic device to perform synchronization to cluster A 71 by transmitting a synchronization beacon or a service discovery frame, including information related to synchronization to cluster A 71, over the synchronization communication duration 710b. In this case, the external electronic device 710 in cluster B 72 may receive a synchronization beacon or a service discovery frame, transmitted from the electronic device 100, over the synchronized communication duration 710 according to cluster B 72. In other words, as the synchronized communication duration 710a according to cluster B 72 and the synchronization communication duration 710b newly configured in cluster A 71 have the same or similar period, the external electronic device 710 included in cluster B 72 may receive a synchronization beacon or a service discovery frame, transmitted from the electronic device 100, over the synchronized communication duration 710a according to cluster B 72 and may discover presence of cluster A 71.

As cluster A 71 is discovered, as described above, the external electronic device 710 may compare attributes (e.g., cluster grades) between cluster B 72 in which the external electronic device 710 is currently participating and cluster A 71 discovered. In an embodiment, as it is determined that the attribute of cluster B 72 is relatively lower (or less) than the attribute of cluster A 71, the external electronic device 710 may release the current synchronized communication duration 710a according to cluster B 72 (see reference numeral 710c) and may perform synchronization to the synchronized communication duration 310 according to cluster A 71. in an embodiment, after transmitting a synchronization beacon or a service discovery frame including information related to synchronization to cluster A 71 (or after the external electronic device 710 included in cluster B 72 performs synchronization to cluster A 71), the electronic device 100 included in cluster A 71 may release synchronization of the synchronization communication duration 710b newly configured (see reference numeral 710d) and may maintain only the synchronized communication duration 310 according to cluster A 71.

An electronic device (e.g., an electronic device 101 of FIG. 1) may include a wireless communication module (e.g., a wireless communication module 192 of FIG. 1) for communicating with at least one external electronic device, a memory (e.g., a memory 130 of FIG. 1) for storing attribute information of a first cluster including the electronic device 101, and a processor (e.g., a processor 120 of FIG. 1) electrically connected with the wireless communication module 192 and the memory 130.

According to various embodiments, the processor 120 may perform synchronization with the first cluster in conjunction with performing communication based on neighbor awareness networking (NAN), may receive a first signal including attribute information of a second cluster from an external electronic device included in the second cluster via the wireless communication module 192, may compare attribute information of the first cluster, the attribute information being stored in the memory 130, with the attribute information of the second cluster, may perform synchronization with the second cluster while maintaining the synchronization with the first cluster, when a specified condition is met between the attribute information of the first cluster and the attribute information of the second cluster, and may transmit a second signal including information related to the first cluster to the external electronic device via the wireless communication module 192 based at least in part on the synchronization with the second cluster.

According to various embodiments, the processor 120 may perform the synchronization with the second cluster while maintaining the synchronization with the first cluster, when a master preference value included in the attribute information of the first cluster is greater than a master preference value included in the attribute information of the second cluster.

According to various embodiments, the processor 120 may compare a random factor value included in the attribute information of the first cluster with a random factor value included in the attribute information of the second cluster, when the master preference values are the same as each other between the attribute information of the first cluster and the attribute information of the second cluster.

According to various embodiments, the processor 120 may perform the synchronization with the second cluster while maintaining the synchronization with the first cluster, when the number of devices forming the first cluster, the number of devices being included in the attribute information of the first cluster, is greater than the number of devices forming the second cluster, the number of devices being included in the attribute information of the second cluster.

According to various embodiments, the processor 120 may perform the synchronization with the second cluster while maintaining the synchronization with the first cluster, when the number of services provided by the first cluster, the number of services being included in the attribute information of the first cluster, is greater than the number of services provided by the second cluster, the number of services being included in the attribute information of the second cluster.

According to various embodiments, the processor 120 may synchronize a second discovery window of the second cluster to at least a portion of a duration except for a first discovery window of the first cluster.

According to various embodiments, the processor 120 may transmit the second signal including information related to the first cluster, through the synchronized second discovery window of the second cluster.

According to various embodiments, the processor 120 may release the synchronization with the second cluster after transmitting the second signal.

An electronic device (e.g., an electronic device 101 of FIG. 1) may include a wireless communication module (e.g., a wireless communication module 192 of FIG. 1) for communicating with at least one external electronic device, a memory (e.g., a memory 130 of FIG. 1) for storing attribute information of a first cluster including the electronic device 101, and a processor (e.g., a processor 120 of FIG. 1) electrically connected with the wireless communication module 192 and the memory 130. The memory 130 may store instructions, when executed, causing the processor 120 to perform synchronization with the first cluster, receive a first signal including attribute information of a second cluster from an external electronic device included in the second cluster via the wireless communication module 192, compare attribute information of the first cluster, the attribute information being stored in the memory 130, with the attribute information of the second cluster, perform synchronization with the second cluster while maintaining the synchronization with the first cluster, when a master rank value included in the attribute information of the first cluster is greater than a master rank value included in the attribute information of the second cluster, and transmit a second signal including information related to the first cluster to the external electronic device via the wireless communication module 192 based at least in part on the synchronization with the second cluster.

According to various embodiments, the instructions may include instructions causing the processor 120 to synchronize a second discovery window of the second cluster to at least a portion of a duration except for a first discovery window of the first cluster.

According to various embodiments, the instructions may include instructions causing the processor 120 to transmit the second signal including the information related to the first cluster, through the synchronized second discovery window of the second cluster.

According to various embodiments, the instructions may include instructions causing the processor 120 to release the synchronization with the second cluster after transmitting the second signal.

An electronic device (e.g., an electronic device 101 of FIG. 1) may include a wireless communication module (e.g., a wireless communication module 192 of FIG. 1) for communicating with at least one external electronic device, a memory (e.g., a memory 130 of FIG. 1) for storing attribute information of a first cluster including the electronic device 101, and a processor (e.g., a processor 120 of FIG. 1) electrically connected with the wireless communication module 192 and the memory 130. The processor 102 may perform synchronization with the first cluster, may receive a first signal including attribute information of a second cluster from an external electronic device included in the second cluster, through a discovery window of the first cluster, may compare the attribute information of the first cluster, the attribute information being stored in the memory 130, with the attribute information of the second cluster, and may perform synchronization with the second cluster while releasing the synchronization with the first cluster, when an attribute information level of the second cluster is relatively higher than an attribute information level of the first cluster.

Figure 8:
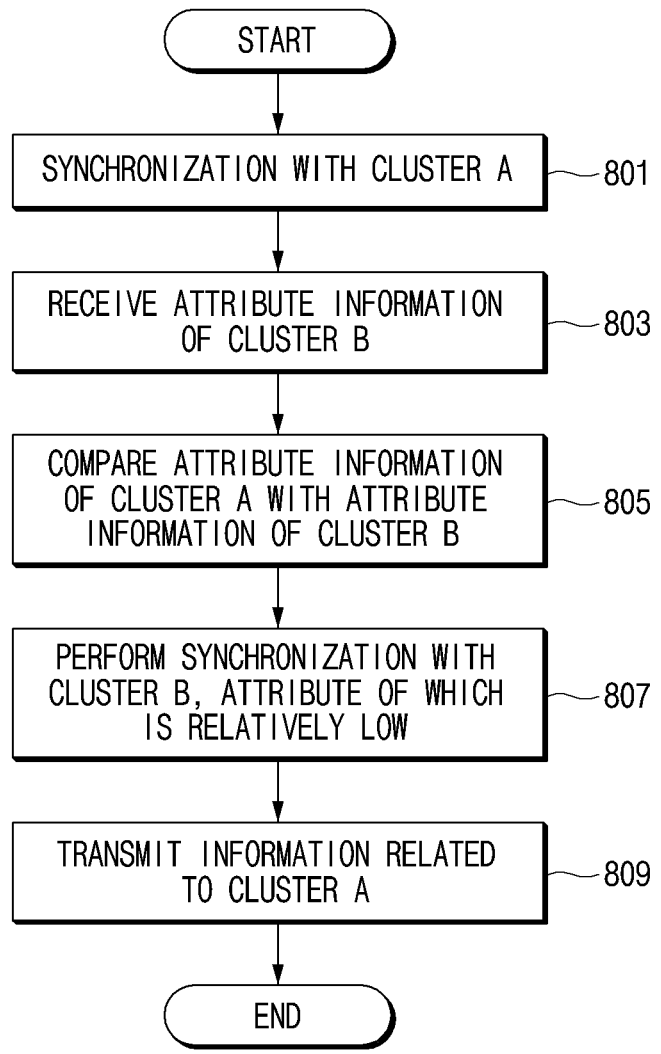
FIG. 8 is a flowchart illustrating a method for controlling communication based on NAN in an electronic device according to an embodiment.
Figure 9:
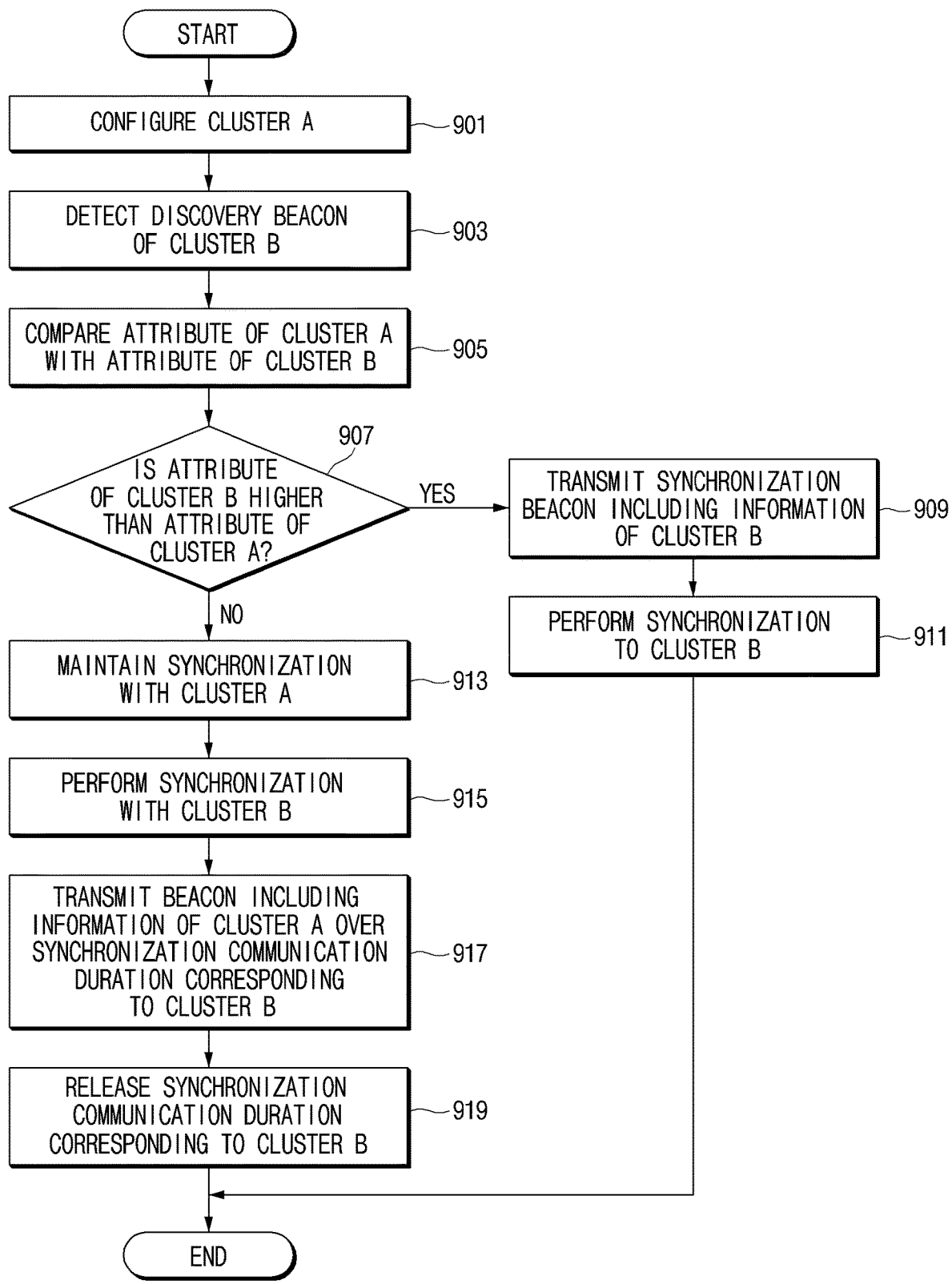
FIG. 9 is a flowchart illustrating a method for transmitting cluster information in an electronic device according to an embodiment.

FIG. 8 is a flowchart illustrating a method for controlling communication based on NAN in an electronic device according to an embodiment. In FIG. 8 or FIG. 9 below, it may be understood that cluster A (e.g., cluster A 61 of FIG. 6 or cluster A 71 of FIG. 7) in which an electronic device (e.g., an electronic device 101 of FIG. 1 or an electronic device 100 of FIG. 6 or 7) is participating is relatively higher (or greater) in attribute than cluster B overlapped with or adjacent to cluster A 61 or 71. Furthermore, in FIG. 8 or 9, a duplicated description may be omitted with respect to an operation or function of the electronic device 100, which is similar to that described above.

Prior to describing FIG. 8, in conjunction with operating the above-mentioned proximity service of the NAN specification, a description will be given of performing functions of components of the electronic device 100 according to an embodiment.

A memory (e.g., a memory 130 of FIG. 1) of the electronic device 100 may store attribute (e.g., cluster grade) information of a cluster in which the electronic device 100 is participating or may store attribute information of an external cluster, which is received from the external cluster.

A wireless communication module (e.g., a wireless communication module 192 of FIG. 1) of the electronic device 100 may establish a network for communicating with at least one external electronic device, under control of a processor (e.g., a processor 120 of FIG. 1), and may transmit and receive a signal or data based on access to the network. According to an embodiment, the wireless communication module 192 may support operation of a low-power proximity communication service of the NAN specification, under control of the processor 120. The processor 120 may control the wireless communication module 192 to establish a network for the low-power proximity communication service of the NAN specification and may transmit and receive a signal or data over a synchronized communication duration (e.g., a discovery window) with another electronic device in a cluster to which the electronic device 100 belongs. In an embodiment, the processor 120 may discover presence of another cluster overlapped with or adjacent to the cluster to which the electronic device 100 belongs, based on proximity service data received over a passive scan duration. For example, when receiving a synchronization beacon or a discovery beacon transmitted from another cluster over the passive scan duration, the processor 120 may discover presence of the other cluster overlapped or adjacent to the cluster including the electronic device 100. Alternatively, when receiving a beacon or a probe response signal from an access point (AP) or a Wi-Fi Direct entity (or a group owner), the processor 120 may discover presence of another cluster overlapped or adjacent to the cluster of the electronic device 100 using a cluster discovery attribute of the received beacon or probe response signal. In an embodiment, when discovering the presence of the other cluster, the processor 120 may determine a cluster to be synchronized, based on a cluster attribute (e.g., a cluster grade) of the electronic device 100 and an attribute of the discovered other cluster. Alternatively, the processor 120 may determine a cluster to be synchronized, based on a cluster attribute including at least one of the number of electronic devices included in the cluster, the number of services provided by the cluster, or a security level of the cluster. For example, the processor 120 may determine a cluster, the electronic devices of which are large in number, a cluster, the services of which are large in number, or a cluster, a security level of which is high, as the cluster to be synchronized. An operation of the electronic device 100, described below with reference to FIG. 8 or 9, may be performed by the processor 120 or may be implemented as the processor 120 controls another component (e.g., the wireless communication module 192 or the like) of the electronic device 100.

Referring to FIG. 8, in operation 801, the processor 120 of the electronic device 100, which starts cluster A 61 or 71 or participates in cluster A 61 or 71, may control the wireless communication module 192 to perform synchronization with cluster A 61 or 71. For example, the processor 120 may perform synchronization of a time clock for operating a proximity service of the NAN specification by transmitting and receiving a synchronization beacon using a parameter (e.g., a discovery window) which functions in the same manner in at least one electronic device included in cluster A 61 or 71. According to various embodiments, in operation 801, the electronic device 100 may be understood as a role and state of any one of the master device, the non-master sync device, or a non-master non-sync device, which is described above.

In operation 803, the processor 120 may receive attribute (e.g., cluster grade) information of cluster B (e.g., cluster B 62 of FIG. 6 or cluster B 72 of FIG. 7) from an external electronic device in cluster B 62 or 72 overlapped or adjacent to cluster A 61 or 71 including the electronic device 100. For example, the processor 120 may receive a synchronization beacon or a discovery beacon of cluster B 62 or 72, which is transmitted by an external electronic device included in cluster B 62 or 72, over a passive scan duration corresponding to some duration on the time clock, and may obtain attribute information of cluster B 62 or 72, which is included in the synchronization beacon or the discovery beacon.

In operation 805, the processor 120 may compare attribute information of cluster A 61 or 71, which is stored in the memory 130, with the obtained attribute information of cluster B 62 or 72 to determine a relative magnitude (being large and small in level or size).

In operation 807, the processor 120 may determine that an attribute of cluster A 61 or 71 in which the electronic device 100 is currently participating is relatively higher (or greater) than the obtained attribute of cluster B 62 or 72. In this case, the processor 120 may maintain the synchronization with the electronic device 100 to cluster A 61 or 71 and may control temporal synchronization (synchronization during a specified time) of the electronic device 100 to cluster B 62 or 72. In an embodiment, the temporal synchronization to cluster B 62 or 72 may refer to configuring a third synchronized communication duration of a period, which is the same as or similar to a second synchronized communication duration of cluster B 62 or 72, using some duration except for a first synchronized communication duration of cluster A 61 or 71 on a time clock according to cluster A 61 or 71. When it is determined that the attribute of cluster A 61 or 71 in which the electronic device 100 is currently participating is relatively lower (or less) than the attribute of cluster B 62 or 72, the processor 120 may release the synchronization with cluster A 61 or 71 and may perform synchronization to cluster B 62 or 72.

In operation 809, the processor 120 may transmit a synchronization beacon or a service discovery frame, including information related to the synchronization to cluster A 61 or 71, over the third synchronization communication duration. In this case, the external electronic device included in cluster B 62 or 72 may discover presence of cluster A 61 or 71 by receiving the synchronization beacon or the service discovery frame, transmitted from the electronic device 100, over the second synchronization communication duration of cluster B 62 or 72. Thus, the synchronization beacon or the service discovery frame transmitted over the third synchronization communication duration of the period, which is the same as or similar to the second synchronization communication duration of cluster B 62 or 72, by the electronic device 100 may guide or support the external electronic device included in cluster B 62 or 72 to perform synchronization to cluster A 61 or 71, an attribute of which is relatively high (or great).

FIG. 9 is a flowchart illustrating a method for transmitting cluster information in an electronic device according to an embodiment.

Referring to FIG. 9, in operation 901, the electronic device (e.g., an electronic device 101 of FIG. 1 or an electronic device 100 of FIG. 6 or 7) may establish a network for a low-power proximity communication service of the NAN specification and may start cluster A (e.g., cluster A 61 of FIG. 6 or cluster A 71 of FIG. 7) or may participate in cluster A 61 or 71. The electronic device 100 in cluster A 61 or 71 may transmit a synchronization beacon and a service discovery frame over a synchronized communication duration (e.g., a discovery window) conforming to the NAN specification or may receive a synchronization beacon and a service discovery frame from another electronic device in cluster A 61 or 71.

In operation 903, the electronic device 100 may detect a discovery beacon transmitted from cluster B (e.g., cluster B 62 of FIG. 6 or cluster B 72 of FIG. 7) over a passive scan duration corresponding to a portion of a duration (e.g., an interval duration between the synchronized communication durations) except for the synchronized communication duration on a time clock. In an embodiment, the passive scan duration may be configured by being triggered by execution of an application program, which is loaded or installed into the electronic device 100 and supports operation of a low-power proximity communication service of the NAN specification, and may be configured by being related to a time when the application program is executed. By detecting the discovery beacon transmitted from cluster B 62 or 72, the electronic device 100 may determine cluster B 62 or 72 as being overlapped or adjacent to cluster A 61 or 71 in which the electronic device 100 is currently participating. In an embodiment, the discovery beacon transmitted from cluster B 62 or 72 may include attribute (e.g., cluster grade) information of cluster B 62 or 72.

In operation 905, the electronic device 100 may compare attribute information of cluster A 61 or 71, which is stored in a memory (e.g., a memory 130 of FIG. 1), with the attribute information of cluster B 62 or 72 received from cluster B 62 or 72. In an embodiment, the attribute information may include a NAN master rank indicating a grade of a corresponding cluster, and the NAN master rank may be understood as a value obtained by adding a master preference, a random factor, and a MAC address (e.g., an interface address of a NAN electronic device). In an embodiment, when comparing attributes between cluster A 61 or 71 and cluster B 62 or 72, the electronic device 100 may compare levels of master rank values according to the value obtained by adding factors such as the master preference, the random factor, and the MAC address. Alternatively, in various embodiments, when comparing attributes between cluster A 61 or 71 and cluster B 62 or 72, the electronic device 100 may first refer to a level of a master rank value according to a master preference value. When the master preference values are the same or similar to each other between cluster A 61 or 71 and cluster B 62 or 72, the electronic device 100 may sequentially refer to a random factor and a MAC address value of each of cluster A 61 or 71 and cluster B 62 or 72. In various embodiments, the attribute of the cluster may include information about the number of electronic devices included in the cluster, information about the number of services provided by the cluster, or information about a security level of the cluster, other than grade information (e.g., a master rank value) of the cluster.

When it is determined that the attribute of cluster B 62 or 72 is relatively higher than the attribute of cluster A 61 or 71 in operation 907, in operation 909, the electronic device 100 may cause at least one other electronic device included in cluster A 61 or 71 to recognize presence of cluster B 62 or 72 by including information related to synchronization to cluster B 62 or 72 in a synchronization beacon transmitted by cluster A 61 or 71. In operation 911, the electronic device 100 may perform synchronization to cluster B 62 or 72, an attribute of which is higher than cluster A 61 or 71 in which the electronic device 100 is currently participating, according to the NAN specification, and may participate in cluster B 62 or 72.

When it is determined that the attribute of cluster B 62 or 72 is relatively lower than the attribute of cluster A 61 or 71 in operation 907, in operation 913, the electronic device 100 may maintain the synchronization with cluster A 61 or 71 in which the electronic device 100 is currently participating.

Operations of the electronic device 100, which are described below, may be understood as an operation of advertising cluster A 61 or 71 to at least one external electronic device forming cluster B 62 or 72 overlapped or adjacent to cluster A 61 or 71, at the same time as maintaining the synchronization with cluster A 61 or 71, or an operation of guiding or supporting the at least one external electronic device to perform synchronization to cluster A 61 or 71.

In operation 915, the electronic device 100 may perform temporal synchronization with cluster B 62 or 72 while maintaining the synchronization with cluster A 61 or 71. For example, the electronic device 100 may newly configure a synchronized communication duration of a period, which is the same as or similar to a synchronized communication duration of cluster B 62 or 72, using at least some duration except for a synchronized communication duration of cluster A 61 or 71 on a time clock according to cluster A 61 or 71.

In operation 917, the electronic device 100 may transmit a synchronization beacon or a service discovery frame, including information related to the synchronization to cluster A 61 or 71, over the newly configured synchronization communication duration. For example, the electronic device 100 may transmit a synchronization beacon or a service discovery frame, including information of cluster A 61 or 71, a predetermined number of times or during a specified time range, such that an external electronic device included in cluster B 62 or 72 may receive information related to cluster A 61 or 71 in which the electronic device 100 is participating. Thus, the external electronic device included in cluster B 62 or 72 may discover presence of cluster A 61 or 71 by receiving the synchronization beacon or the service discovery frame, transmitted from the electronic device 100, over the synchronization communication duration of cluster B 62 or 72. Thereafter, the external electronic device included in cluster B 62 or 72 may compare attributes between cluster B 62 or 72 and cluster A 61 or 71 in the same or similar manner to being described above, and may release the synchronization communication duration of old cluster B 62 or 72 as it is determined that the attribute of cluster B 62 or 72 is relatively lower (or less) than the attribute of cluster A 61 or 71 and perform synchronization to cluster A 61 or 71 (e.g., synchronization to the synchronization communication duration of cluster A 61 or 71).

In operation 919, after transmitting the information related to cluster A 61 or 71 to cluster B 62 or 72 (or after the external electronic device included in cluster B 62 or 72 is synchronized to cluster A 61 or 71), the electronic device 100 included in cluster A 61 or 71 may release the synchronization of the newly configured synchronization communication duration and may maintain only the synchronization with cluster A 61 or 71.

A method for controlling communication based on neighbor awareness networking (NAN) in an electronic device (e.g., an electronic device 101 of FIG. 1) according to various embodiments may include performing synchronization with a first cluster including the electronic device, receiving a first signal including attribute information of a second cluster from an external electronic device included in the second cluster, comparing attribute information of the first cluster with the attribute information of the second cluster, performing synchronization with the second cluster while maintaining the synchronization with the first cluster, when a specified condition is met between the attribute information of the first cluster and the attribute information of the second cluster, and transmitting a second signal including information related to the first cluster to the external electronic device based at least in part on the synchronization with the second cluster.

According to various embodiments, the performing of the synchronization with the second cluster while maintaining the synchronization with the first cluster may include performing the synchronization with the second cluster while maintaining the synchronization with the first cluster, when a master preference value included in the attribute information of the first cluster is greater than a master preference value included in the attribute information of the second cluster.

According to various embodiments, the comparing of the attribute information of the first cluster and the attribute information of the second cluster may include comparing a random factor value included in the attribute information of the first cluster with a random factor value included in the attribute information of the second cluster, when the master preference values are the same as each other between the attribute information of the first cluster and the attribute information of the second cluster.

According to various embodiments, the performing of the synchronization with the second cluster while maintaining the synchronization with the first cluster may include performing the synchronization with the second cluster while maintaining the synchronization with the first cluster, when the number of devices forming the first cluster, the number of devices being included in the attribute information of the first cluster, is greater than the number of devices forming the second cluster, the number of devices being included in the attribute information of the second cluster.

According to various embodiments, the performing of the synchronization with the second cluster while maintaining the synchronization with the first cluster may include performing the synchronization with the second cluster while maintaining the synchronization with the first cluster, when the number of services provided by the first cluster, the number of services being included in the attribute information of the first cluster, is greater than the number of services provided by the second cluster, the number of services being included in the attribute information of the second cluster.

According to various embodiments, the performing of the synchronization with the second cluster while maintaining the synchronization with the first cluster may include synchronizing a second discovery window of the second cluster to at least a portion of a duration except for a first discovery window of the first cluster.

According to various embodiments, the transmitting of the second signal including the information related to the first cluster to the external electronic device may include transmitting the second signal including the information related to the first cluster, through the synchronized second discovery window of the second cluster.

According to various embodiments, the method may further include releasing the synchronization with the second cluster after transmitting the second signal.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:
1. An electronic device, comprising:
a wireless communication module configured to communicate with at least one external electronic device;
a memory for storing attribute information of a first cluster including the electronic device; and
a processor electrically connected with the wireless communication module and the memory,
wherein the processor is configured to:
perform synchronization with the first cluster, in conjunction with performing communication based on neighbor awareness networking (NAN);
receive a first signal including attribute information of a second cluster from an external electronic device included in the second cluster via the wireless communication module;
compare attribute information of the first cluster with the attribute information of the second cluster, the attribute information being stored in the memory;
perform temporal synchronization with the second cluster while maintaining the synchronization with the first cluster, when a specified condition is met between the attribute information of the first cluster and the attribute information of the second cluster; and
transmit a second signal including information related to the first cluster to the external electronic device via the wireless communication module based at least in part on the temporal synchronization with the second cluster,
wherein the processor is further configured to:
configure a third synchronization for performing the temporal synchronization,
wherein the third synchronized communication duration of a period, which is the same as or similar to a second synchronized communication duration of the second cluster using some duration except for a first synchronized communication duration of the first cluster.

2. The electronic device of claim 1, wherein the processor is further configured to:
perform the synchronization with the second cluster while maintaining the synchronization with the first cluster, when a master preference value included in the attribute information of the first cluster is greater than a master preference value included in the attribute information of the second cluster.

3. The electronic device of claim 2, wherein the processor is further configured to:
compare a random factor value included in the attribute information of the first cluster with a random factor value included in the attribute information of the second cluster, when the master preference values are the same as each other between the attribute information of the first cluster and the attribute information of the second cluster.

4. The electronic device of claim 2, wherein the processor is further configured to:
perform the synchronization with the second cluster while maintaining the synchronization with the first cluster, when the number of devices forming the first cluster, the number of devices forming the first cluster being included in the attribute information of the first cluster, is greater than the number of devices forming the second cluster, the number of devices forming the second cluster being included in the attribute information of the second cluster.

5. The electronic device of claim 1, wherein the processor is further configured to:
perform the synchronization with the second cluster while maintaining the synchronization with the first cluster, when the number of services provided by the first cluster, the number of services provided by the first cluster being included in the attribute information of the first cluster, is greater than the number of services provided by the second cluster, the number of services provided by the first cluster being included in the attribute information of the second cluster.

6. The electronic device of claim 1, wherein the processor is further configured to:
synchronize a second discovery window of the second cluster to at least a portion of a duration except for a first discovery window of the first cluster.

7. The electronic device of claim 6, wherein the processor is further configured to:
transmit the second signal including information related to the first cluster, through the synchronized second discovery window of the second cluster.

8. The electronic device of claim 1, wherein the processor is further configured to:
release the synchronization with the second cluster after transmitting the second signal.

9. A method for controlling communication based on neighbor awareness networking (NAN) in an electronic device, the method comprising:
performing synchronization with a first cluster including the electronic device;
receiving a first signal including attribute information of a second cluster from an external electronic device included in the second cluster;
comparing attribute information of the first cluster with the attribute information of the second cluster;
performing temporal synchronization with the second cluster while maintaining the synchronization with the first cluster, when a specified condition is met between the attribute information of the first cluster and the attribute information of the second cluster; and
transmitting a second signal including information related to the first cluster to the external electronic device based at least in part on the temporal synchronization with the second cluster,
wherein the method further comprising:
configuring a third synchronization for performing the temporal synchronization,
wherein the third synchronized communication duration of a period, which is the same as or similar to a second synchronized communication duration of the second cluster using some duration except for a first synchronized communication duration of the first cluster.

10. The method of claim 9, wherein the performing of the synchronization with the second cluster while maintaining the synchronization with the first cluster includes:
performing the synchronization with the second cluster while maintaining the synchronization with the first cluster, when a master preference value included in the attribute information of the first cluster is greater than a master preference value included in the attribute information of the second cluster.

11. The method of claim 10, wherein the comparing of the attribute information of the first cluster and the attribute information of the second cluster includes:
comparing a random factor value included in the attribute information of the first cluster with a random factor value included in the attribute information of the second cluster, when the master preference values are the same as each other between the attribute information of the first cluster and the attribute information of the second cluster.

12. The method of claim 9, wherein the performing of the synchronization with the second cluster while maintaining the synchronization with the first cluster includes:
performing the synchronization with the second cluster while maintaining the synchronization with the first cluster, when the number of devices forming the first cluster, the number of devices forming the first cluster being included in the attribute information of the first cluster, is greater than the number of devices forming the second cluster, the number of devices forming the second cluster being included in the attribute information of the second cluster.

13. The method of claim 9, wherein the performing of the synchronization with the second cluster while maintaining the synchronization with the first cluster includes:
performing the synchronization with the second cluster while maintaining the synchronization with the first cluster, when the number of services provided by the first cluster, the number of services provided by the first cluster being included in the attribute information of the first cluster, is greater than the number of services provided by the second cluster, the number of services provided by the second cluster being included in the attribute information of the second cluster.

14. The method of claim 9, wherein the performing of the synchronization with the second cluster while maintaining the synchronization with the first cluster includes:
synchronizing a second discovery window of the second cluster to at least a portion of a duration except for a first discovery window of the first cluster.

15. The method of claim 9, wherein the transmitting of the second signal including the information related to the first cluster to the external electronic device includes:
transmitting the second signal including the information related to the first cluster, through the synchronized second discovery window of the second cluster.

* * * * *